(12) United States Patent
Park et al.

(10) Patent No.: US 7,630,025 B2
(45) Date of Patent: Dec. 8, 2009

(54) ANISOTROPIC DIFFUSION SHEET

(75) Inventors: Kwang-Seung Park, Daejeon Metropolitan (KR); Kyung-Mo Kim, Daejeon Metropolitan (KR); Jang-Hoon Lee, Daegu Metropolitan (KR); Hyung-Ju Ahn, Daejeon Metropolitan (KR); Sang-Choll Han, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/223,700

(22) PCT Filed: Feb. 20, 2007

(86) PCT No.: PCT/KR2007/000881

§ 371 (c)(1),
(2), (4) Date: Aug. 7, 2008

(87) PCT Pub. No.: WO2007/097558

PCT Pub. Date: Aug. 30, 2007

(65) Prior Publication Data

US 2009/0009687 A1    Jan. 8, 2009

(30) Foreign Application Priority Data

Feb. 21, 2006 (KR) ...................... 10-2006-0016864

(51) Int. Cl.
*G02F 1/1335* (2006.01)
(52) U.S. Cl. .............................. 349/64; 349/56; 349/61; 349/62
(58) Field of Classification Search .................. 349/56, 349/61, 62, 64
See application file for complete search history.

(56) References Cited

U.S. PATENT DOCUMENTS

| 6,861,121 | B2 | 3/2005 | Matsunaga et al. |
| 7,448,771 | B2 * | 11/2008 | Jang et al. .................... 362/235 |
| 7,505,101 | B2 * | 3/2009 | Ichihashi et al. ............ 349/118 |

FOREIGN PATENT DOCUMENTS

| JP | 2001-159704 | 6/2001 |
| JP | 2003-050307 | 2/2003 |
| JP | 2004-151592 | 5/2004 |
| KR | 10-1994-0011999 | 1/1996 |
| KR | 10-2003-0080764 | 10/2003 |
| WO | WO 99/19753 | 4/1999 |
| WO | WO 2004-104658 | 12/2004 |

* cited by examiner

*Primary Examiner*—Jennifer Doan
(74) *Attorney, Agent, or Firm*—McKenna Long & Aldridge LLP

(57) ABSTRACT

The present invention provides an anistropic diffusion sheet, which comprises an isotropic diffusion layer for isotropically diffusing the light incident from the light source portion by internal light scattering; and a plurality of reflectors which is disposed at an interval on the upper surface of the isotropic diffusion layer, so as to reflect the light isotropically diffused by the isotropic diffusion layer to the display panel, wherein the light, emitted from the light source portion and then becomes incident to the isotropic diffusion layer, is isotropically diffused through the isotropic diffusion layer, the light isotropically illuminated by the isoptropic diffusion layer is the reflected by the plurality of reflector to be anisotropically diffuse, and this anisotropically diffused light becomes incident to the liquid crystal display panel.

18 Claims, 2 Drawing Sheets

[Fig. 1]
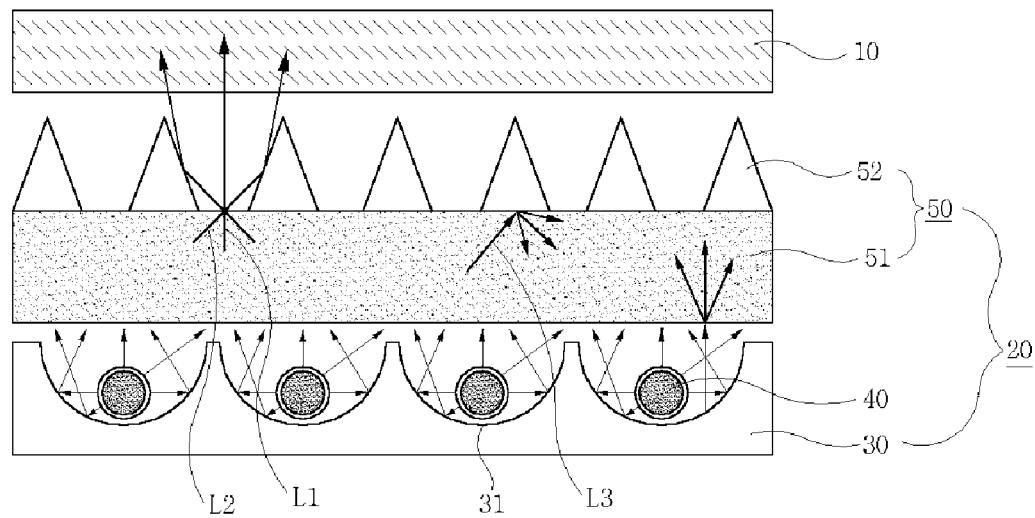
[Fig. 2]
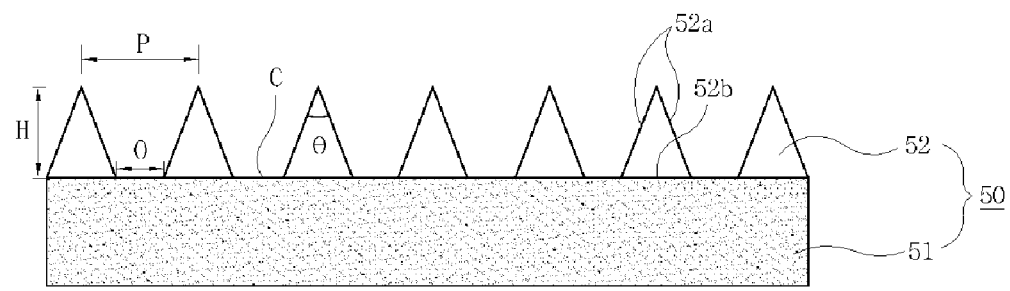
[Fig. 3]
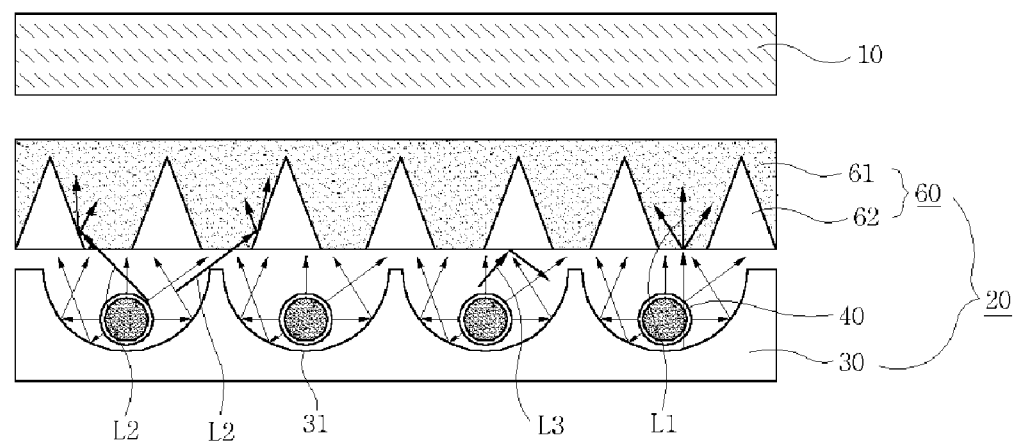
[Fig. 4]
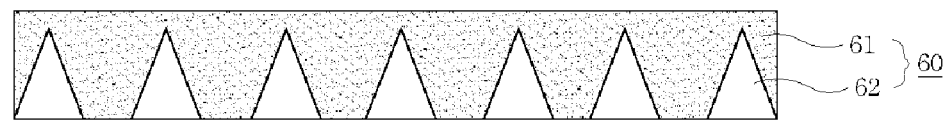

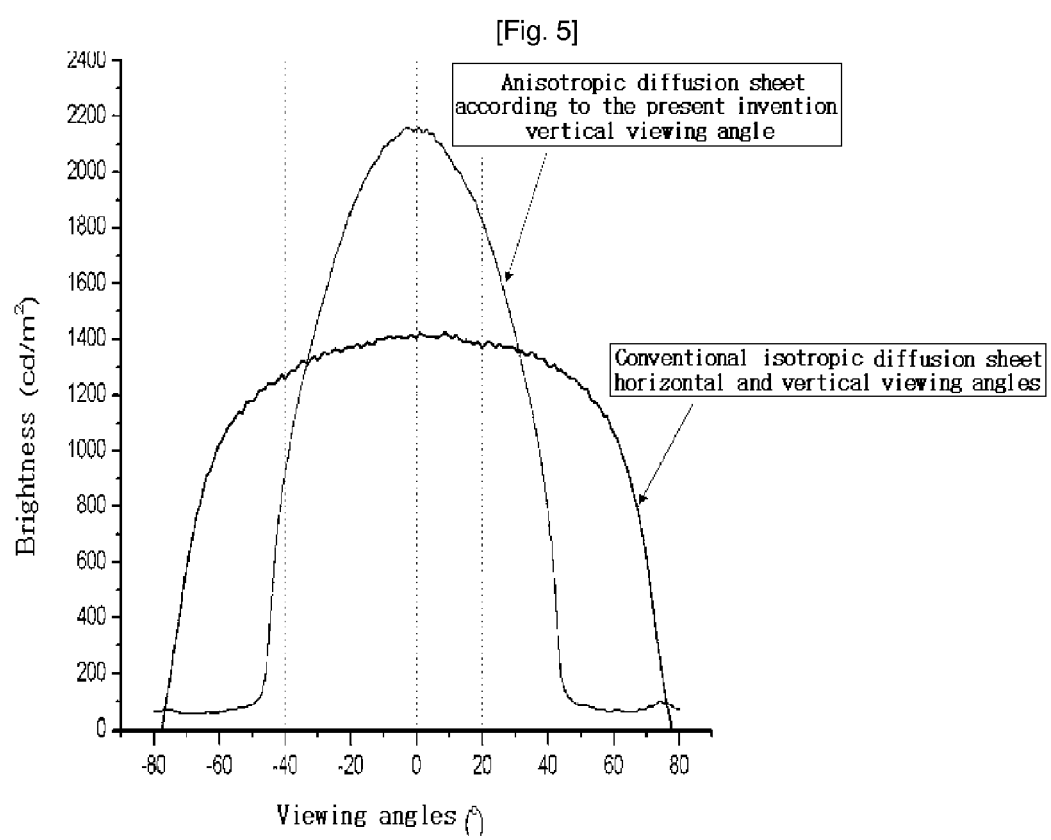

ANISOTROPIC DIFFUSION SHEET

This is an application of International Application No. PCT/KR2007/000881, filed Feb. 20, 2007 which claims the priority of Korean Application No. 10-2006-0016864, filed Feb. 21, 2006, which are hereby incorporated by reference for all purposes as if fully set forth herein.

The present invention relates to an anisotropic diffusion sheet, which comprises an isotropic diffusion layer and a reflector, and provides an anisotropic luminance distribution in which a vertical luminance distribution and a horizontal luminance distribution are different from each other.

BACKGROUND ART

Recently, instead of conventional CRT (Cathode Ray Tube), lots of flat panel display devices such as a liquid crystal display device (LCD), PDP (Plasma Display Panel), and an OLED (Organic Emitting Diode) have been developed.

Among these, the liquid crystal display device comprises a thin film transistor substrate, a color filter substrate, and a liquid crystal display panel having liquid crystal injected between the two substrates.

The liquid crystal is a non-light-emitting material which controls the amount of the light incident from the outside and displays it on a screen, rather than a light emitting material which itself emits light. Thus, generally the liquid crystal display device is provided with a back light unit for illuminating light on the liquid crystal display panel.

The back light unit comprises a light source portion for generating light, and an optical sheet which is disposed under the liquid crystal display panel and changes the characteristics of the light emitted from the light source portion. The back light unit is classified into two types of units, i.e., an edge type of a unit in which the light source portion is provided on the side of the light guide plate, and a direct type of a unit in which the light source portion is provided under the liquid crystal display panel, according to the positions of the light source portion.

The optical sheet comprises a diffusion sheet for diffusing the light from the light source portion and supplying it to the liquid crystal display panel, and a prism sheet for vertically condensing the light diffused by the diffusion sheet to a plane of the liquid crystal display panel.

Herein, since the diffusion sheet generally used is isotropic in view of the light scattering property, it has a problem that it reduces the luminance in a certain direction to an extent more than needed.

In order to solve the problem, JP Patent Application Publication No. 2001-159704 discloses an anisotropic light scattering film comprising particles dispersed in the resin for providing high anisotropicity to the incident light. From this, the anisotropicity of the light scattering becomes higher, whereby reduction in the luminance in a certain direction can be suppressed, and a uniform luminance can be provided.

However, these conventional anisotropic light scattering films use expensive raw materials for preparation of an anisotropic light scattering film, which leads to high production cost, and difficult processes such as orientation. Thus, the preparation is not easy, which gives a problem that the productivity is deteriorated.

Therefore, in the preparation of the anisotropic diffusion sheet, it is preferable to reduce the production cost relative to the conventional sheets, and eliminate the complicated and difficult processes such as orientation to establish a simpler production process, thus the productivity being improved.

Further, in the case where the anisotropic diffusion sheet is used in a liquid crystal display device, if a prism sheet is eliminated from the liquid crystal display device by performing both of the light diffusion function and the light condensing function, a back light unit having a slim appearance and a liquid crystal display device comprising the same are preferably provided.

DISCLOSURE OF INVENTION

Technical Problem

It is an object of the present invention to provide an anisotropic diffusion sheet, which comprises an isotropic diffusion layer and a reflector, and can provide an anisotropic luminance distribution in which a vertical luminance distribution and a horizontal luminance distribution are different from each other, reduce production cost and improve productivity.

Technical Solution

In one embodiment of the present invention for achieving the above object, there is provided an anisotropic diffusion sheet provided between a light emitting light source portion and a display panel to illuminate the light incident from the light source portion to the display panel, which comprises an isotropic diffusion layer for isotropically diffusing the light incident from the light source portion by internal light scattering; and a plurality of reflectors which has an interface interfacing with the upper surface of the isotropic diffusion layer and at least one pair of the inclined surfaces disposed inclined on the upper surface of the isotropic diffusion layer, is formed to protrude from the upper surface of the isotropic diffusion layer, and is disposed at an interval on the upper surface of the isotropic diffusion layer, so as to reflect the light isotropically diffused by the isotropic diffusion layer to the display panel.

Herein the light, emitted from the light source portion and then becomes incident to the isotropic diffusion layer, is isotropically diffused through the isotropic diffusion layer, the light isotropically illuminated by the isotropic diffusion layer is then reflected by the plurality of reflector to be anisotropically diffused, and this anisotropically diffused light becomes incident to the liquid crystal display panel.

The isotropic diffusion layer may comprise a resin of transparent materials, and light scattering particles having refractive indices differing from that of the resin by 0.02 to 0.1, or less.

Herein, the resin can be at least one selected from polyester, polyvinyl chloride, polycarbonate, polymethylmethacrylate, polystyrene, polyestersulfone, polybutadiene, polyetherketone and polyurethane.

The light scattering particles can be at least one selected from polymethyl-methacrylate, polystyrene, polybutadiene, a copolymer thereof, and silica.

Each of the reflectors can have cross-section shape of an isosceles triangle or a scalene triangle.

Further, the reflector can comprise inorganic material particles having refractive indices of 1.6 or more.

The reflector can comprise a resin, and inorganic material particles to be mixed with the resin.

Herein, the resin can be at least one selected from urethane acrylate, epoxy acrylate, ester acrylate, ether acrylate and radical-generating monomers.

The inorganic material particles can be at least one selected from $TiO_2$, $BaSO_4$, $Al(OH)_3$, $Al_2O_3$, $CaCO_3$, $ZnO$ and $ZnS$.

In another embodiment of the present invention, there is provided a back light unit comprising an anisotropic diffusion sheet according to the present invention.

In another embodiment of the present invention, there is provided a liquid crystal display device comprising the back light unit.

In another embodiment of the present invention, there is provided an anisotropic diffusion sheet provided between a light emitting light source portion and a display panel to illuminate the light incident from the light source portion to the display panel, which comprises an isotropic diffusion layer for isotropically diffusing the light incident from the light source portion by internal light scattering; and a plurality of reflectors which has an interface facing with the light source portion and at least one pair of the inclined surfaces disposed inclinedly on the interface, is formed in the inside of the isotropic diffusion layer, and is disposed at an interval on in the inside of the isotropic diffusion layer, so as to reflect the light isotropically diffused by the isotropic diffusion layer to the display panel.

Herein the light, emitted from the light source portion and then becomes incident to the isotropic diffusion layer, is isotropically diffused, the light isotropically illuminated by the isotropic diffusion layer is then reflected by the plurality of reflector to be anisotropically diffused, and this anisotropically diffused light becomes incident to the liquid crystal display panel. In the present embodiment, specific description will be omitted since the description on above-mentioned embodiment will be equally applied hereto except that the reflector is formed in the inside of the isotropic diffusion layer.

In another embodiment of the present invention, there is provided a back light unit comprising an anisotropic diffusion sheet according to the present invention.

In another embodiment of the present invention, there is provided a liquid crystal display device comprising the back light unit.

Advantageous Effects

As discussed above, according to the present invention, the light incident to the isotropic diffusion layer is isotropically diffused by internal light scattering and then reflected by the reflector, thereby providing an anisotropic luminance distribution in which a vertical luminance distribution and a horizontal luminance distribution are different from each other, and thus improving the light efficiency.

Further, it is easy to prepare the anisotropic diffusion sheet according to the present invention, which can reduce the production cost, and improve the productivity.

Meanwhile, if the anisotropic diffusion sheet according to the present invention is employed in a projector screen or a back light unit of a liquid crystal display device, a high horizontal luminance distribution and a low vertical luminance distribution are provided, and thus a higher luminance can be provided within an effective viewing range than that the luminance of an isotropic diffusion sheet.

In particular, if the anisotropic diffusion sheet according to the present invention is employed in a back light unit of a liquid crystal display device, the anisotropic diffusion sheet gives an excellent shielding effect for showing a surface light source having uniform brightness by shielding the light source portion of a line light source type. Further, the anisotropic diffusion sheet according to the present invention eliminates a prism sheet from the back light unit of the liquid crystal display device by performing both of the light diffusion function and the light condensing function, which provides a simpler construction of the back light unit, and thus yields a slimmer back light unit.

BRIEF DESCRIPTION OF THE DRAWINGS

FIG. 1 is a schematic decomposition cross-section diagram of the liquid crystal display device according to Example 1 of the present invention;

FIG. 2 is a cross-section diagram of the anisotropic diffusion sheet according to Example 1 of the present invention;

FIG. 3 is a schematic decomposition cross-section diagram of the liquid crystal display device according to Example 2 of the present invention;

FIG. 4 is a cross-section diagram of the anisotropic diffusion sheet according to Example 2 of the present invention;

FIG. 5 is a graph showing comparison between the luminance distribution of a conventional isotropic diffusion sheet and the luminance distribution of the anisotropic diffusion sheet according to the present invention.

Numeral references
10: Liquid crystal display panel
20: Back light unit
30: Reflecting frame
31: Reflecting portion
40: Lamp
50: Anisotropic diffusion sheet
51: Isotropic diffusion layer
52: Reflector

MODE FOR THE INVENTION

Hereinbelow, the present invention will be described in detail with reference to the accompanying figures.

As shown in FIG. 1, the liquid crystal display device according to the present invention comprises a liquid crystal display panel (10) having a thin film transistor substrate, a color filter substrate, liquid crystal injected between the two substrate, and a back light unit (20) which is disposed under the liquid crystal display panel (10) and emits light to the liquid crystal display panel (10).

The back light unit (20) is a non-light-emitting material which gives a display on screen by controlling the amount of the light incident from the outside, rather than a light emitting material in which liquid crystal itself emits light, and therefore, it functions to supply light to the liquid crystal display panel (10).

The back light unit (20) comprises light emitting light source portions (30, 40), and an anisotropic diffusion sheet (50) disposed between the liquid crystal display panel (10) and the light source portion (30, 40).

The light source portion (30, 40) comprises a reflecting frame (30) having a plurality of reflecting portions (31) disposed at a predetermined interval, and a plurality of lamps (40) disposed each corresponding to the plurality of reflecting portions (31).

Each reflecting portion (31) has a semicircle cross-sectional shape, and reflects the light emitted from the lamp (40) toward the anisotropic diffusion sheet (50).

As shown in FIGS. 1 and 2, the anisotropic diffusion sheet (50) according to Example 1 of the present invention can perform both of the functions of diffusing the light emitted from the lamp (40), and of condensing the light in the direction vertical to the plane of the liquid crystal display panel (10).

Specifically, the anisotropic diffusion sheet (50) comprises an isotropic diffusion layer (51) for isotropically diffusing the light incident by internal light scattering; and a plurality of reflectors (52) disposed at an interval on the isotropic diffusion layer (51). Herein, the isotropic diffusion layer (51) has a flat plate shape and each reflector(52) has a triangle cross-sectional shape.

The anisotropic diffusion sheet (50) as constructed above isotropically diffuses the incident light by light scattering in the isotropic diffusion layer (51), and then reflects the light by the reflectors (52) to narrow diffusion angles. The light emitted from the lamp (40) is anisotropically diffused through the anisotropic diffusion sheet (50) and then is incident to the liquid crystal display panel (10). In the present invention, the term "isotropic diffusion" is when the diffusivity of light in the horizontal direction is equal to the diffusivity of light in the vertical direction. And the term "anisotropic diffusion" is when the diffusivity of light in the horizontal direction is different from the diffusivity of light in the vertical direction.

The isotropic diffusion layer (51) is provided to be opaque by comprising a resin of transparent materials, and light scattering particles having refractive indices differing from that of the resin by 0.02 to 0.1, or less.

Preferable examples of the resin of transparent materials include polyester, polyvinyl chloride, polycarbonate, polymethylmethacrylate, polystyrene, polyestersulfone, polybutadiene, polyetherketone and polyurethane, each singly or in combinations of two or more thereof.

Preferable examples of the light scattering particles include polymeric organic materials such as polymethylmethacrylate, polystyrene and polybutadiene, each singly or in combinations of two or more thereof, and inorganic materials such as silica. As an example, the light scattering particles can be prepared by using polymethyl-methacrylate, polystyrene, polybutadiene, or silica, each singly; by using a mixture of any one of polymethylmethacrylate, polystyrene and polybutadiene, and silica; or by preparing a copolymer using at least two selected from polymethylmethacrylate, polystyrene and polybutadiene, and incorporating silica to the copolymer.

The light scattering particles may have oval shapes or an aspect ratio of approximately 1 substantially spherical shape, or it may be amorphous particles.

Further, the reflector (52) is provided to comprise a resin and inorganic material particles.

Preferable examples of the resin include urethane acrylate, epoxy acrylate, ester acrylate, ether acrylate and a radical-generating monomer, each singly or in combinations of two or more thereof.

Preferable examples of the inorganic material particles include any one selected from $TiO_2$, $BaSO_4$, $Al(OH)_3$, $Al_2O_3$, $CaCO_3$, ZnO and ZnS having refractive indices of 1.6 or more. Metal particles such as silver and aluminum can be used instead of the inorganic material particles.

The reflector (52) of a structure for regular reflection can be obtained by dispersing the metal particles to small sizes of several tens nm to several hundreds nm (i.e., particles as small as possible since it has no relationship between the size of the metal particles and the reflectance). Meanwhile, in the case of the reflector (52) of a structure for diffusion reflection, inorganic material particles having refractive indices of 1.6 or more and particles sizes in the range from nano- to microscale are used, wherein the content of the particles is set to be 50% or more, based on the total weight (of the resin and the particles). The total reflectance of the prepared reflector (52) is set to be 80% or more. When conventionally measuring the reflectance of the prepared reflector (52), although the method varies depending on the nature or size of a product, generally the reflector (52) is prepared by using a plate sample having a thickness of 100 0 and, the reflectance is measured at an incident angle of the light source of 45 degree, not on the front surface of the plate. As such, if the reflectance is measured in this manner, the reflectance of the reflector (52) in the present invention is 50 to 90%.

As shown in FIG. 2, the reflector (52) has a triangle cross-sectional shape, and has a bottom surface (52*b*) which is an interface interfacing with the upper surface of the isotropic diffusion layer (51), and a pair of the inclined surfaces (52*a*) disposed inclinedly on the upper surface of the isotropic diffusion layer. Herein, the reflector (52) is provided to have an isosceles triangle cross-sectional shape, or a scalene triangle cross-sectional shape.

In FIG. 2, 0 indicates an angle included between a pair of inclined surfaces (52*a*), and P (pitch) indicates a distance from a vertex of one reflector (52) to a vertex of another reflector (52). Further, C indicates an opening face corresponding to an interval from the bottom surface (52*b*) of one reflector (52) to the bottom surface (52*b*) of another reflector (52), and 0 indicates a width of the opening face (C) corresponding to an interval from the bottom surface (52*b*) of one reflector (52) to the bottom surface (52*b*) of another reflector (52).

Herein, each pitch (P) is greater than the width of the opposite opening face (C), and the reflectors (52) are each provided to have the same height (H). Further, the reflectors may be each provided to have different heights because of Moire, or the like.

Thus, the open ratio (ORA) can be expressed as [width (O) of opening face/pitch (P)*100(%)], and the height (H) of each reflector (52) can be expressed as [pitch (P)-width (O) of opening face]/[2*tan(0/2)]. As such, light is controlled by the open ratio (ORA) and the included angle (0). Herein, it is preferable that the pitch (P) is 5 to 300 □; the included angle (θ) is 1 to 50 degree; and the open ratio (ORA) is 20 to 70, and the height (H) of the reflector is a dependent variable determined by the pitch (P) and the included angle (θ). Of course, the pitch (P), the included angle (θ), and the open ratio (ORA) can be appropriately modified (decreased or increased), if desired.

Hereinbelow, the method for preparing the anisotropic diffusion sheet (50) according to Example 1 of the present invention will be described.

First, in order to prepare an isotropic diffusion layer (51), a resin comprising the light scattering particles is prepared, and then an isotropic diffusion layer (51) is prepared using a flat first mold (unshown) in a method such as extrusion and casting.

Thereafter, in order to form the reflector (52), a heat- or light-curable reflecting material is applied onto an entire second mold (unshown) having wedge grooves formed thereon, and then the surface of the second mold is scratched using a rubber knife, thereby the reflecting material being filled only in the wedge grooves of the second mold.

To thus prepared second mold, the preliminarily prepared isotropic diffusion layer (51) is closely attached, and then heat- or light-cured to complete the preparation of the anisotropic diffusion sheet (50) having the isotropic diffusion layer (51) and a plurality of reflectors (52) as shown in FIGS. 1 and 2. At this time, the preliminarily prepared isotropic diffusion layer (51) is treated with a primer, plasma, corona, or the like, to make the attachment easier.

Hereinafter, the path of the light incident to the anisotropic diffusion sheet (50) according to Example 1 of the present invention, prepared using the above-described prepared method, will be described in detail. The light which is emitted from the lamp (40), incident to the isotropic diffusion layer (51), and then illuminated to the isotropic diffusion layer (51)

through the opening face (C) is straightly directed to the liquid crystal display panel (10) according to the angles at which the isotropic diffusion layer (51) is incident, as shown in FIG. 1, or is reflected by the inclined surface (52*a*) of the reflector (52). For convenient explanation, the light, which is not reflected by the reflector (52), but is straightly directed to the liquid crystal display panel (10), is denoted as $L_1$; the light, which is reflected by the inclined surface (52*a*) of the reflector (52), and is directed to the liquid crystal display panel (10), is denoted as $L_2$; and the light, which is reflected by the bottom surface (52*b*) of the reflector (52), and is directed to the light source portion (30, 40), is denoted as $L_3$. As shown in FIG. 1, $L_1$ incident to the isotropic diffusion layer (51) is illuminated through the opening face (C), and then straightly directed to the liquid crystal display panel (10) without contact with the reflector (52), and $L_2$ is incident to the isotropic diffusion layer (51) at a large angle, illuminated through the opening face (C), reflected by the bottom surface (52*a*) of the reflector (52) and then straightly directed to the liquid crystal display panel (10). Herein, as $L_2$ is reflected by the bottom surface (52*a*) of the reflector (52), the advancing angle is narrower, and thus it can be straightly directed to the liquid crystal display panel (10) as in $L_1$.

Further, $L_3$ is incident to the isotropic diffusion layer (51) at a large angle, reflected by the bottom surface (52*b*) of the reflector (52) without contact with the opening face (C), and then directed to the light source portion (30, 40). The light directed to the light source portion (30, 40) is reflected by the reflecting portion (31), and then re-directed to the isotropic diffusion layer (51) of the anisotropic diffusion sheet (50).

As such, in the anisotropic diffusion sheet (50) according to Example 1 of the present invention, the light emitted from the lamp (40) is illuminated only through the opening face (C), isotropically diffused by the isotropic diffusion layer (51), and then directed to the direction vertical to the plane of the liquid crystal display panel (10) by the inclined surface (52*a*) of the reflector (52).

Meanwhile, in Example 1, a plurality of reflectors (52) are provided on the upper surface of the isotropic diffusion layer (51), but as shown in FIGS. 3 and 4, each illustrating the anisotropic diffusion sheet (60) according to Example 2, a plurality of reflectors (62) are provided in the isotropic diffusion layer (61).

As shown in FIGS. 3 and 4, a plurality of reflectors (62) embedded at a predetermined interval in the isotropic diffusion layer (61) are disposed in opposed relation to each other, such that the bottom surface is directly exposed to the light emitted from the lamp (40), and a pair of the inclined surfaces are disposed in the isotropic diffusion layer (61).

Hereinbelow, the method for preparing the anisotropic diffusion sheet (60) according to Example 2 of the present invention will be described.

First, in order to prepare an isotropic diffusion layer (61), a resin comprising the light scattering particles is prepared, and then an isotropic diffusion layer (61) is prepared using a flat first mold (unshown) having wedge grooves formed thereon in a method such as extrusion and casting.

A heat- or light-curable reflective material is applied onto the entire isotropic diffusion layer (61) having wedge grooves formed thereon, and then the surface is scratched using a rubber knife, thereby the reflective material being filled only in the wedge grooves.

Thereafter, the layer is heat- or light-cured to complete the preparation of the anisotropic diffusion sheet (60) having a plurality of reflectors (62) embedded in the isotropic diffusion layer (61), as shown in FIGS. 3 and 4.

Hereinafter, the path of the light incident to the anisotropic diffusion sheet (60) according to Example 2 of the present invention, prepared using the above-described prepared method, will be described in detail.

As shown in FIG. 3, $L_1$ directly incident to the isotropic diffusion layer (61) is straightly directed to the liquid crystal display panel (10) without contact with the reflector (62), and $L_2$ is incident to the isotropic diffusion layer (61) at a large angle, reflected by the inclined surface of the reflector (62) disposed in the isotropic diffusion layer (61), illuminated from the anisotropic diffusion sheet (60), and then directed to the liquid crystal display panel (10). Herein, as $L_2$ is reflected by the inclined surface of the reflector (62), the advancing angle is narrower, and thus it can be straightly directed to the liquid crystal display panel (10) as in $L_1$.

Further, $L_3$ is not incident to the isotropic diffusion layer (61), but is reflected by the bottom surface of the reflector (62), and then directed to the light source portion (30, 40). The light directed to the light source portion (30, 40) is reflected by the reflecting portion (31), and then re-directed to the isotropic diffusion layer (61) of the anisotropic diffusion sheet (60).

As such, in the anisotropic diffusion sheet (60) according to Example 2 of the present invention, the light emitted from the lamp (40) is incident to the isotropic diffusion layer (61) only through the opening face (interval between one reflector and another reflector), isotropically diffused by the isotropic diffusion layer (61), and directed to the direction vertical to the plane of the liquid crystal display panel (10) by the inclined surface of the reflector (62).

Accordingly, in the anisotropic diffusion sheets (50, 60) according to Examples 1 and 2 of the present invention, the light is isotropically diffused by the isotropic diffusion layers (51, 61), and reflected by the reflectors (52, 62), and thus an anisotropic luminance distribution having a low vertical luminance distribution and a high horizontal luminance distribution is provided. From this, light efficiency is improved, and a higher luminance is provided within an effective viewing range.

FIG. 5 also confirms that the anisotropic diffusion sheets (50, 60) according to Examples 1 and 2 of the present invention can provide improved higher luminance than that of the conventional isotropic diffusion sheets.

In the anisotropic diffusion sheets (50, 60) according to Examples 1 and 2 of the present invention, a prism sheet is eliminated from the back light unit by performing both of the light diffusion function of the diffusion sheet and the light condensing function of the prism sheet, which provides a simpler construction of the back light unit, and thus yields a slimmer back light unit.

It is easy to prepare the anisotropic diffusion sheets (50, 60) according to Examples 1 and 2 of the present invention, which can reduce the production cost, and improve the productivity.

Further, if the anisotropic diffusion sheets (50, 60) according to Examples 1 and 2 of the present invention give an excellent shielding ability since the isotropic diffusion layers (51, 61) are provided to be opaque. Further, the term "shielding ability" means that the image (substantial grey level difference) of an object is too blurred to discriminate the boundaries between the objects. This is achieved by passage through or reflection on a scattering layer, and the shielding effect is exhibited by scattering, not maintaining as such, the positions of the lights starting from the original objects. Thus, since the isotropic diffusion layers (51, 61) are provided to be opaque, an excellent shielding effect for showing a surface light source having uniform brightness by shielding a appearance of the rod-shaped lamp (40) (which is referred to as line light source), that is, the line appearance of the lamp (40).

As discussed above, although the anisotropic diffusion sheet according to the present invention is described with reference to the liquid crystal display device, the anisotropic diffusion sheet according to the present invention can be also employed in a projector screen.

What is claimed is:

1. An anisotropic diffusion sheet provided between a light emitting light source portion and a display panel to illuminate the light incident from the light source portion to the display panel, which comprises:
   an isotropic diffusion layer for isotropic ally diffusing the light incident from the light source portion by internal light scattering; and
   a plurality of reflectors which has an interface interfacing with the upper surface of the isotropic diffusion layer and at least one pair of the inclined surfaces disposed inclinedly on the upper surface of the isotropic diffusion layer, is formed to protrude from the upper surface of the isotropic diffusion layer, and is disposed at an interval on the upper surface of the isotropic diffusion layer, so as to reflect the light isotropically diffused by the isotropic diffusion layer to the display panel,
   wherein the light, emitted from the light source portion and then becomes incident to the isotropic diffusion layer, is isotropically diffused through the isotropic diffusion layer, the light isotropically illuminated by the isotropic diffusion layer is then reflected by the plurality of reflector to be anisotropically diffused, and this anisotropically diffused light becomes incident to the liquid crystal display panel.

2. The anisotropic diffusion sheet according to claim 1, wherein the isotropic diffusion layer comprises a resin of transparent materials, and light scattering particles having refractive indices differing from that of the resin by 0.02 to 0.1, or less.

3. The anisotropic diffusion sheet according to claim 2, wherein the resin is at least one selected from polyester, polyvinyl chloride, polycarbonate, polymethyl-methacrylate, polystyrene, polyestersulfone, polybutadiene, polyetherketone and polyurethane; and
   the light scattering particles are at least one selected from polymethyl-methacrylate, polystyrene, polybutadiene, a copolymer thereof, and silica.

4. The anisotropic diffusion sheet according to claim 1, wherein the reflector comprises inorganic material particles having refractive indices of 1.6 or more.

5. The anisotropic diffusion sheet according to claim 4, wherein the reflector comprises a resin, and inorganic material particles to be mixed with the resin,
   the resin is at least one selected from urethane acrylate, epoxy acrylate, ester acrylate, ether acrylate and radical-generating monomers, and
   the inorganic material particles are at least one selected from $TiO_2$, $BaSO_4$, $Al(OH)_3$, $Al(OH)$ $Al_2O_3$, $CaCO_3$, ZnO and ZnS.

6. The anisotropic diffusion sheet according to claim 1, wherein the plurality of reflectors each have isosceles triangle cross-sectional shapes.

7. The anisotropic diffusion sheet according to claim 1, wherein the plurality of reflectors each have scalene triangle cross-sectional shapes.

8. A back light unit comprising the anisotropic diffusion sheet according to claim 1.

9. A liquid crystal display device comprising the back light unit according to claim 8.

10. An anisotropic diffusion sheet provided between a light emitting light source portion and a display panel to illuminate the light incident from the light source portion to the display panel, which comprises:
    an isotropic diffusion layer for isotropic ally diffusing the light incident from the light source portion by internal light scattering; and
    a plurality of reflectors which has an interface facing with the light source portion and at least one pair of the inclined surfaces disposed inclinedly on the interface, is formed in the inside of the isotropic diffusion layer, and is disposed at an interval on in the inside of the isotropic diffusion layer, so as to reflect the light isotropically diffused by the isotropic diffusion layer to the display panel, wherein the light, emitted from the light source portion and then becomes incident to the isotropic diffusion layer, is isotropically diffused, the light isotropically illuminated by the isotropic diffusion layer is then reflected by the plurality of reflector to be anisotropically diffused, and this anisotropically diffused light becomes incident to the liquid crystal display panel.

11. The anisotropic diffusion sheet according to claim 10, wherein the isotropic diffusion layer comprises a resin of transparent materials, and light scattering particles having refractive indices differing from that of the resin by 0.02 to 0.1, or less.

12. The anisotropic diffusion sheet according to claim 10, wherein the resin is at least one selected from polyester, polyvinyl chloride, polycarbonate, polymethyl-methacrylate, polystyrene, polyestersulfone, polybutadiene, polyetherketone and polyurethane; and
    the light scattering particles are at least one selected from polymethyl-methacrylate, polystyrene, polybutadiene, a copolymer thereof, and silica.

13. The anisotropic diffusion sheet according to claim 10, wherein the reflector comprises inorganic material particles having refractive indices of 1.6 or more.

14. The anisotropic diffusion sheet according to claim 13, wherein the reflector comprises a resin, and inorganic material particles to be mixed with the resin,
    the resin is at least one selected from urethane acrylate, epoxy acrylate, ester acrylate, ether acrylate and radical-generating monomers, and
    the inorganic material particles are at least one selected from $TiO_2$, $BaSO_4$, $Al(OH)_3$, $Al_2O_3$, $CaCO_3$, ZnO and ZnS.

15. The anisotropic diffusion sheet according to claim 10, wherein the plurality of reflectors each have isosceles triangle cross-sectional shapes.

16. The anisotropic diffusion sheet according to claim 10, wherein the plurality of reflectors each have scalene triangle cross-sectional shapes.

17. A back light unit comprising the anisotropic diffusion sheet according to claim 10.

18. A liquid crystal display device comprising the back light unit according to claim 17.

* * * * *